United States Patent [19]
Adams

[11] 3,855,859
[45] Dec. 24, 1974

[54] FLOWMETER
[75] Inventor: Robert B. Adams, Tredyffrin Township, Chester County, Pa.
[73] Assignee: Moore Products Co., Spring House, Pa.
[22] Filed: Aug. 20, 1973
[21] Appl. No.: 390,045

[52] U.S. Cl. ............................... 73/194 B, 137/842
[51] Int. Cl. ............................................. G01f 1/00
[58] Field of Search .......... 73/194 R, 194 B, 194 C, 73/32 A, 339 A, DIG. 8, 505, 515; 137/826, 842

[56] References Cited
UNITED STATES PATENTS
| | | | |
|---|---|---|---|
| 3,363,453 | 1/1968 | Erickson | 73/54 |
| 3,640,133 | 2/1972 | Adams | 73/194 B |

FOREIGN PATENTS OR APPLICATIONS
| | | | |
|---|---|---|---|
| 1,225,570 | 3/1971 | Great Britain | 137/842 |

Primary Examiner—Charles A. Ruehl
Attorney, Agent, or Firm—Zachary T. Wobensmith, 2nd; Zachary T. Wobensmith, III

[57] ABSTRACT

A flowmeter is provided having a through passageway for the flow to be measured with a fluid interaction chamber and feedback means to provide an oscillation of the flow. The frequency of this oscillation is linearly and proportionally related to volume rate of flow and is independent of all fluid properties in the turbulent range, i.e., the frequency for a given volume flow rate will be the same for any liquid or gas as long as the flow is turbulent. Provisions are made for detecting this oscillation and a sensor is provided which is responsive to changes in the heat transfer rates to the surrounding media. An equalizing chamber is provided intermediate the ends of the fluid interaction chamber which is connnected to the exhaust to give a more uniform response over a wider range of flows.

6 Claims, 5 Drawing Figures

PATENTED DEC 24 1974

FLOWMETER

BACKGROUND OF THE INVENTION

1. Field of the Invention

The present invention relates to flowmeters utilizing the principles of pure fluid amplifiers in which a frequency is established corresponding to a particular flow, the frequency being measured to determine the flow.

2. DESCRIPTION OF THE PRIOR ART

In my prior U.S. Pat. No. 3,640,133 a flowmeter is provided in which a through passageway is provided for the flow to be measured with a fluid interaction chamber and feedback means associated with the chamber to provide an oscillation of the flow whose frequency is linearly and proportionately related to volume rate of flow. In that patent prior U.S. patents are specifically referred to, all of which share in common that the only approach for obtaining an oscillation is to introduce a prime delay in the feedback means external to the interaction chamber of the device, whereas in the present invention the prime time delay is obtained outside the feedback means, the source flow leaves the interaction chambers of these disclosures through separated discharge passageways, and there is no through flow or flow to a single exit.

In my prior U.S. Pat. No. 3,640,133 a substantially constant interior height is shown from end to end. It has been ascertained that by including an equalizing chamber along the diverging side walls of the interaction chamber and in advance of the inlets to the feedback passageways and venting this to the outlet, that a greater jet force can be applied for increased feed back with a more uniform response over a wider range of flows.

SUMMARY OF THE INVENTION

In accordance with the present invention, a flowmeter is provided with through flow and having provisions for setting up a frequency proportional to volume flow rate, this relationship being the same for any compressible or incompressible fluid as long as the flow is turbulent and subsonic, with passageways shaped to provide minimum permanent pressure loss and the maximum possible frequency and with an equalizing chamber interiorly disposed and vented to the discharge for obtaining more uniform response over a wide range of flows.

It is an object of the present invention to provide a flowmeter in which a frequency proportional to volume flow is set up without moving parts and the frequency is advantageously detected in a location where turbulence and noise are reduced, and the measurement is made available as either a digital or analog signal, and with capability of greater force application for better feed back.

It is a further object of the invention to provide a flowmeter which can be employed in a fluid flow line without interposing any substantial resistance to fluid flow.

Other objects and advantageous features of the invention will be apparent from the description and claims.

BRIEF DESCRIPTION OF THE DRAWING

The nature and characteristic features of the invention will be more readily understood from the following description taken in connection with the accompanying drawings forming part thereof, in which.

Figure 1:
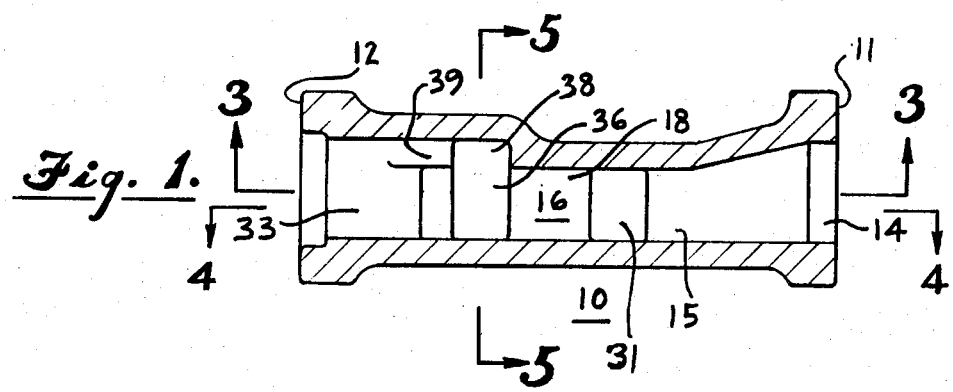
FIG. 1 is a vertical central longitudinal sectional view of a flowmeter in accordance with the invention and taken approximately on the line 1—1 of FIG. 4.
Figure 2:
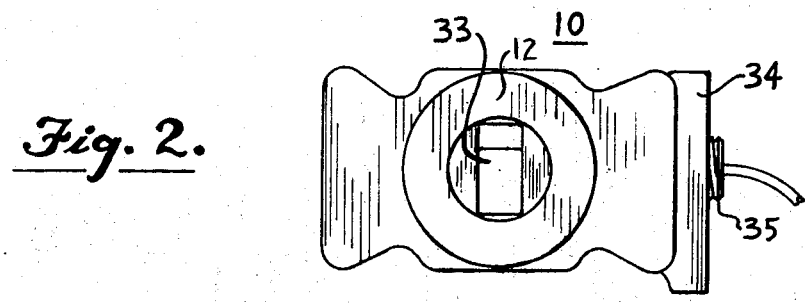
FIG. 2 is an end elevational view of the flowmeter as seen from the left side of FIG. 1.
Figure 3:
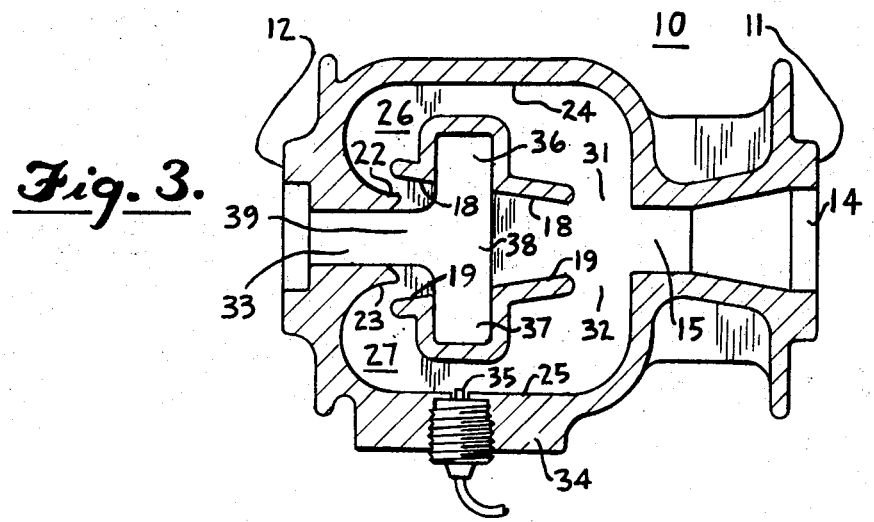
FIG. 3 is a horizontal longitudinal sectional view taken approximately on the line 3—3 of FIG. 1.
Figure 4:
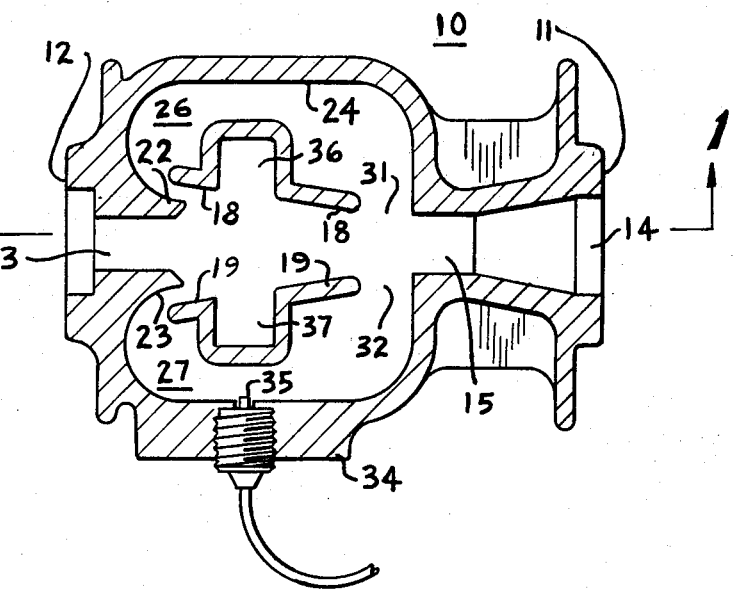
FIG. 4 is a horizontal longitudinal sectional view taken approximately on the line 4—4 of FIG. 1.
Figure 5:
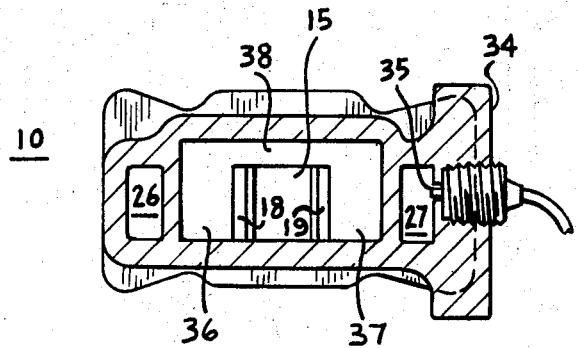
FIG. 5 is a transverse vertical sectional view taken approximately on the line 5—5 of FIG. 1.

It should, of course, be understood that the description and drawings herein are illustrative merely, and that various modifications and changes can be made in the structure disclosed without departing from the spirit of the invention.

Like numerals refer to like parts through the several views.

DESCRIPTION OF THE PREFERRED EMBODIMENTS

Referring now more particularly to the drawings, a body 10 is provided, which may be made of any desired construction such as by casting or molding, and of any desired material in accordance with the field of use, and which may include materials inert to the fluid whose flow is to be measured.

The body 10 has exterior end mounting surfaces 11 and 12 and an inlet opening 14 for the supply of the fluid whose flow is to be measured in communication with a nozzle 15 for introducing the fluid in jet form into an interaction or steering chamber 16 which is aligned with the nozzle. The chamber 16 has diverging side walls 18 and 19 onto either of which fluid from the nozzle 15 can lock, as hereinafter explained.

The side walls 18 and 19 have therebeyond curved walls 22 and 23 which provide, with the walls 18 and 19 and with side walls 24 and 25 feedback paths 26 and 27 on each side of the chamber 16. Control nozzles 31 and 32 on each side and at the inner terminal of the nozzle 15 provide for communication of the feedback paths 26 and 27 with the chamber 16.

The chamber 16 also has a discharge passageway 33 aligned with the nozzle 15 and extending to end surface 12.

At a selected location within the body which may be in one of the feedback paths such as the feedback path 27 a fluid movement detector 35 is provided for transmitting pulses responsive to oscillations of fluid within the body 10 in the feedback path 27.

For this purpose, and merely by way of example, the detector 35 carried in a boss 34 can be as shown in prior U.S. Pat. No. 3,640,133, and with suitable circuitry for providing an analog signal for indicating, recording or controlling the fluid flow.

An alternate mode of utilizing the signal from the sensing means would be to rectify, filter, shape and amplify the frequency into square wave pulses suitable for use with any counter so as to obtain indication of the total volume passed through the flowmeter.

The diverging side walls 18 and 19, intermediate their ends, and upstream of the walls 22 and 23 have recessed regions 36 and 37 connected at the top by a transverse equalizing passageway 38 and with a horizontal relief passageway 39 extending along and communicating with the discharge passageway 33.

The mode of operation will now be pointed out.

Assume that fluid is supplied through the fluid inlet opening 14 and through the nozzle 15 into the interaction chamber 16. If the fluid jet entering the chamber 16 from the nozzle 15 is in the position such that it is attached to the wall 18 a portion of this jet guided by curved wall 22 will enter feedback path 26 and flow toward control nozzle 31. At this time, because of the counterclockwise circulation of the flow in the chamber 16 and the converging shape at the passageway 33 there is a very little tendency, if any, for flow to occur in the feedback path 27. When the flow occurs in feedback path 26, it exits the control nozzle 31 and deflects the jet from the nozzle 15 toward the wall 19. However, because the jet from the nozzle 15 just after this occurrence is still moving along the wall 22 the feedback which produces the back flow along the path 26 continues for a time after the initial switching action so as to insure a complete and positive switching of the entire jet from the nozzle 15 to the wall 19.

After the jet is completely attached to the wall 19 it feeds fluid guided by the curved wall 23 back through the feedback path 27 and back toward control nozzle 32 where it will act to return the jet from the nozzle 15 toward the side wall 18.

It has been found by experiment, that when the lengths of the feedback paths are kept short enough that the prime time delay determining the half period of oscillation occurs between the point at which the jet is first switched by a control port to the opposite wall and the time at which the new position of the jet is fully established and begins to exert force on the feedback passage associated with the new wall, that two very useful and new results are obtained. First the frequency of oscillation obtained with a compressible fluid in the subsonic turbulent range is now proportional with volume flow rate. Second, the relationship between volume flow rate and frequency is the same for all liquids and gases in the turbulent range. Therefore, the new and useful result that is obtained is a volume flowmeter whose calibration is independent of fluid properties.

The provision of the recessed regions 36 and 37, interconnected by horizontal equalizing passageway 38, will now be explained. When the jet from nozzle 15 impacts against the mount of the feedback path 26 or 27, a pressure build-up occurs at the mouth which tends to feed back along the sidewalls 18 or 19. If this pressure were not relieved by the regions 36 and 37 and the passageway 38, it would cause the jet from nozzle 15 to veer away from the sidewall 18 or 19, thereby reducing the force available to drive flow through these feedback paths 26 or 27. This undesirable effect is minimized in the device of this invention.

The horizontal relief passageway 39 is particularly useful with liquids which have entrained gases. These entrained gases might easily become trapped in the recessed regions 36 and 37, and the transverse equalizing passageway 38, were it not for the passageway 39 venting to the discharge.

The use of the recessed regions 36 and 37, and passageways 38 and 39 has been found to accommodate greater force in the jet which enhances the feedback. At the same time a more uniform response over a wider range of flows is obtained.

I claim:

1. A fluid oscillator comprising
    means directing a fluid stream therethrough and imparting to the fluid of said stream an oscillation whose frequency is directly proportional to the velocity of the fluid stream, said means including
    an elongated interaction chamber bounded by a pair of spaced walls and substantially normal thereto a pair of diverging side walls for fluid jet attachment,
    a nozzle at one end of said chamber for directing a fluid jet into said chamber,
    a discharge passageway at the other end of said chamber through which all the fluid from said nozzle is discharged,
    control ports communicating with said chamber contiguous to said nozzle, and
    feedback passageways connected to said control ports from locations in said chamber upstream of said discharge passageway and downstream of said side walls,
    said locations being aligned with the fluid jet attached to said side walls,
    said side walls intermediate their ends having recessed regions with a transverse equalizing passageway therebetween.

2. A fluid oscillator as defined in claim 1 in which
    said equalizing passageway has a connection therefrom to said discharge passageway.

3. A fluid oscillator as defined in claim 1 in which
    a member is provided responsive to the interior fluid oscillation.

4. A fluid oscillator as defined in claim 1 in which
    a member is provided in one of said feedback passageways responsive to said fluid oscillation for transmitting a signal related thereto.

5. A flow-sensitive device comprising
    a body having wall portions providing,
    a fluid inlet nozzle having a connection to a source of fluid for providing a fluid jet,
    said nozzle passing all of the flow to be measured,
    an interaction chamber with which said nozzle is in communication,
    said interaction chamber having opposite diverging side walls for fluid jet attachment and a discharge passageway,
    control ports communicating with said chamber contiguous to said nozzle,
    feedback means connected to said interaction chamber upstream of said discharge passageway and having inlets aligned with the jet attached to said side walls to receive a portion of fluid coming from said fluid inlet nozzle and extending to said control ports for switching the fluid from said nozzle successively with respect to said side walls for establishing a fluid oscillation, and
    said diverging side walls between said control ports and said feedback means inlets having recessed regions interconnected by an equalizing passageway, and
    a member responsive to said fluid oscillation for transmitting a signal related thereto.

6. A flow-sensitive device as defined in claim 5 in which
    said equalizing passageway has a venting connection therefrom to said discharge passageway.

* * * * *